United States Patent [19]

Arora

[11] Patent Number: 5,755,445

[45] Date of Patent: May 26, 1998

[54] NONCONTACTING FINGER SEAL WITH HYDRODYNAMIC FOOT PORTION

[75] Inventor: Gulshan K. Arora, Chandler, Ariz.

[73] Assignee: AlliedSignal Inc., Morris Township, N.J.

[21] Appl. No.: 701,936

[22] Filed: Aug. 23, 1996

[51] Int. Cl.[6] .................................................. F16J 15/447
[52] U.S. Cl. ...................... 277/53; 277/192; 415/173.5; 415/174.5
[58] Field of Search .......................... 277/53, 173, 174, 277/175, 192, 135, 215; 384/100, 114; 415/173.1, 173.3, 173.5, 172.4, 174.5

[56] References Cited

U.S. PATENT DOCUMENTS

| | | | |
|---|---|---|---|
| 5,031,922 | 7/1991 | Heydrich | 277/53 |
| 5,042,823 | 8/1991 | Mackay et al. | |
| 5,071,138 | 12/1991 | Mackay et al. | 277/53 |
| 5,108,116 | 4/1992 | Johnson et al. | |
| 5,161,945 | 11/1992 | Clevenger et al. | |
| 5,370,402 | 12/1994 | Gardner et al. | 277/173 |
| 5,522,698 | 6/1996 | Butler et al. | |
| 5,558,341 | 9/1996 | McNickle et al. | 277/215 |

FOREIGN PATENT DOCUMENTS

| | | | |
|---|---|---|---|
| 241831 | 4/1969 | U.S.S.R. | 384/100 |

OTHER PUBLICATIONS

Fuller: "Theory and Practice of Lubrication for Engineers"; pp. 154–155. Jun. 25, 1956.

Booser: "CRC Handbook of Lubrication, vol. II"; pp. 100, 435, and 617. Jul. 26, 1984.

"Basic Lubrication Theory" 2nd Ed. by Alastair Cameron (Ellis Horwood Series in Engineering Science, 1976 Ellis Horwood Ltd.) pp. 56 and 57.

Primary Examiner—Scott Cummings
Attorney, Agent, or Firm—Jerry J. Holden

[57] ABSTRACT

The present invention provides an annular sealing apparatus for disposition in cooperation with a body defining a bore and a rotating member rotatably received in said bore to inhibit fluid leakage therebetween. The sealing apparatus is comprised of axially juxtaposed first and second comb-like pluralities of uniformly spaced and integral finger members circumscribing the rotating member. Each finger member has substantially the same width and is separated from adjacent finger members by a uniform gap. At the innermost end of each finger is a foot portion sealingly and movably engaging said rotating member. Each foot portion is configured so as to lift away from the rotating member and ride on a thin film of air during engine operation. The first and second comb-like members are positioned so that the fingers of each block the gaps in the other.

19 Claims, 3 Drawing Sheets

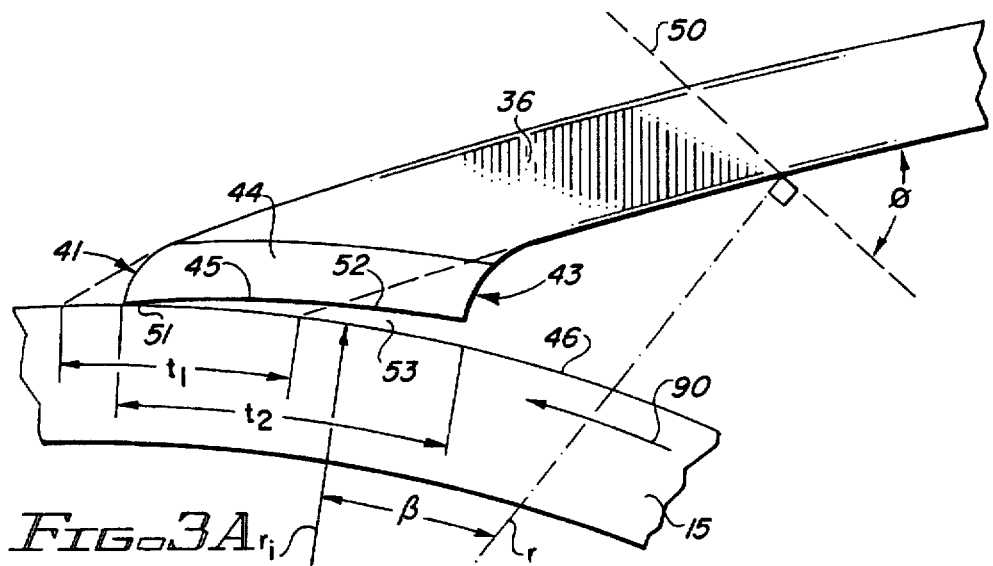
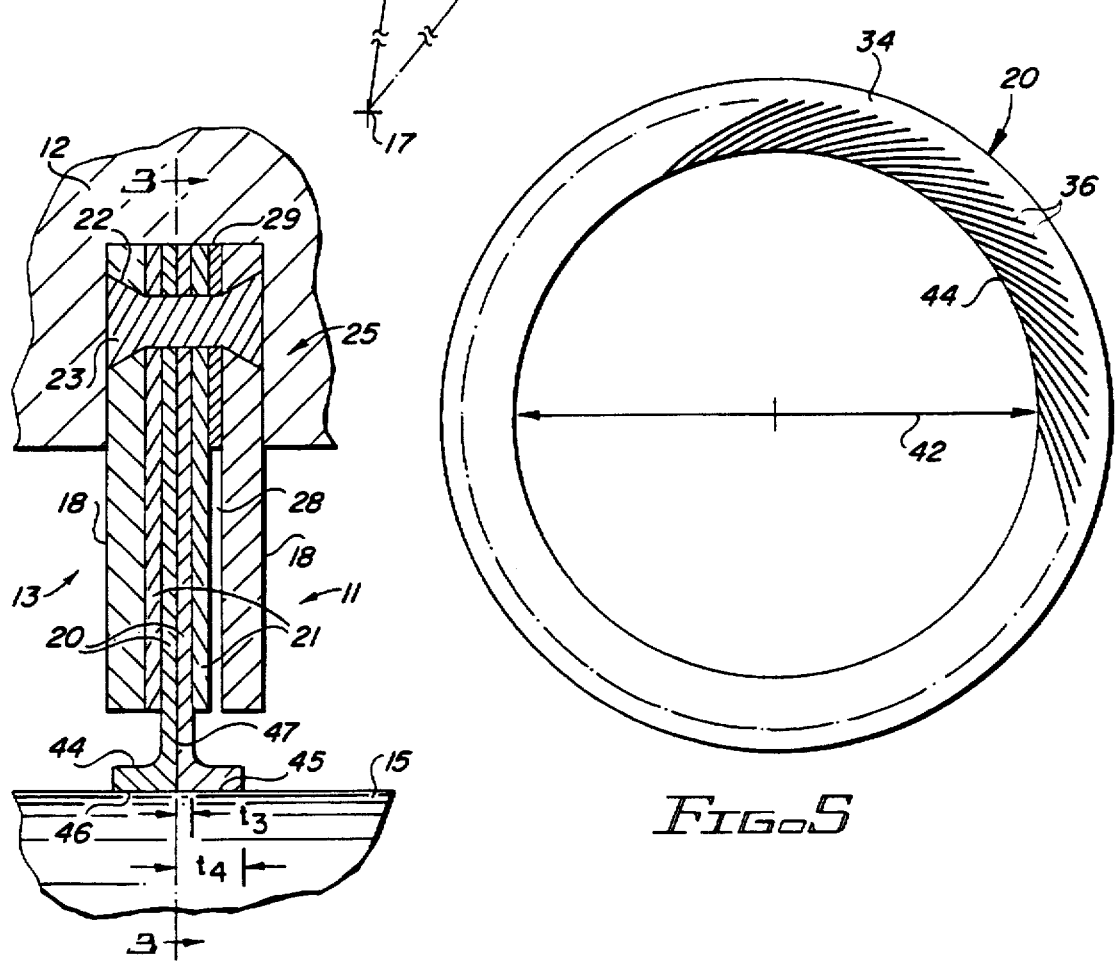

NONCONTACTING FINGER SEAL WITH HYDRODYNAMIC FOOT PORTION

TECHNICAL FIELD

This invention relates generally to sealing devices disposed in association with two relatively rotatable members and providing a fluid seal therebetween. More particularly, the present invention relates to an apparatus for achieving sealing between a rotatable shaft and a housing circumscribing the rotatable shaft.

BACKGROUND OF THE INVENTION

Gas turbine engines employ sealing devices in various capacities where it is necessary to restrict the flow of fluid or gases from one portion of the engine to another. A common use is for separating the primary engine flowpath from the secondary flowpath. The primary engine flowpath directs the flow of gases to the compressor and turbine stages, from which the engine derives thrust or power. The secondary flowpath comprises a series of conduits for delivering compressed air throughout the engine for performing a variety of functions. Compressed air is used for example to cool individual components, provide a bleed air source, buffer the lubricated bearing cavities, control the ventilation among engine cavities and structures, and affect the thrust balance of the engine. Loss of compressed air from the secondary flowpath through leakage can have a substantial adverse effect on the performance of these functions. In a turbine engine, typically at least one sealing device is required for each turbine and compressor stage of the engine.

Another common use for sealing devices in turbine engines is for separating the secondary flowpath from engine cavities containing fluids such as lubricating oil. In pressurized aircraft, bleed air taken from the secondary flowpath supplies the aircraft environmental control system. Even small amounts of oil in the bleed air can render it unsuitable for this purpose. Further, oil leakage can lead to coking of the seal, and ultimately reduced seal life. To prevent this, buffered sealing devices are typically incorporated adjacent lubricated bearings and engine oil sumps.

The most common type of seal used for these purposes is the labyrinth seal. A labyrinth seal is comprised of a multiplicity of radially extending annular knives mounted on a rotating shaft, and an annular seal land closely circumscribing the knife edges. The gap between the knife edges and the lands restricts the flow of secondary flowpath air therethrough, creating a seal.

A problem inherent with labyrinth seals is that these gaps must be large enough to accommodate radial excursions of the shafting on which the seal is mounted. Radial excursions can be substantial, particularly in propulsion gas turbine engines used in aircraft. Large radial excursions may be caused by critical speed response, aircraft maneuver induced loading, impact loads, engine vibration, and thermal and speed transients. To minimize leakage, a relatively thick layer of material is added to the seal land, into which the seal knives cut grooves during these radial excursions. The added layer of material typically consists of either a coating of silver or ceramic abradable material, or a welded on honeycomb type material.

Labyrinth seals are also very costly to manufacture. The rotating portions are machined from expensive high-strength forgings to a complex shape having exacting dimensional requirements. Additionally, in many of these seals a costly manufacturing technique is required for welding on the leakage reducing honeycomb material to the seal land. Nevertheless, gaps remain fairly large in operation and the leakage rates higher than desired for many applications.

An improved sealing concept less commonly seen in turbine engines is the brush seal. Brush seals may take a variety of forms for use in a variety of types of applications. When configured for use in a turbine engine, brush seals are typically comprised of a plurality of generally radially oriented metal wires tightly packed and bound at their outer ends into an annular retainer. This brush structure, which comprises the non-rotating part of the seal, is mounted to a wall or plenum structure which houses a rotating shaft. The radially innermost tips of the wires making up the brush form a bore for receiving the rotating shaft in a slightly radially interfering relationship. Because of the flexibility of this brush portion, the seal can accommodate radial excursions of the shafting without the need for a radial gap between the seal and shaft. Thus, leakage is confined predominately to migration of fluid through the brush portion itself, and is controlled by ensuring that the wires are densely packed. Brush seals are typically selected based on their sealing capability, providing improved sealing over even multi-stage labyrinth seals.

However, brush seals suffer from a high rate of wear and must be replaced often. The ends of the metal wires begin wearing immediately upon use, causing leakage between the brush and the shaft to increase over time. In turbine engine applications wear induced leakage may ultimately reach an unacceptable level, necessitating replacement of the seal. The continuous rubbing contact also tends to abrade the surface of the shaft, or rotating component in contact with the brush, potentially resulting in expensive replacement or rework of the rotating parts as well. Yet another problem associated with brush seals is that they have a tendency to occasionally lose bristles. This tendency may preclude the use of a brush seal in applications where the resulting risk of damage to neighboring components is high.

On the other hand, as the demands for small sizes, increased power outputs, and improved specific fuel consumptions increase in the turbine engine arts, the brush seal becomes increasingly attractive. Such is the case because of the brush seal's improved sealing effectiveness, smaller size, and it is hoped, decreased engine cost when compared to engine designs using conventional labyrinth seals.

Another type of seal more recently developed, and sharing similar attractive attributes, is the finger seal. Finger seals are structurally similar to brush seals in that they are comprised generally of a plurality of flexible members fixed at one end, the opposite ends sealingly engaging a surface that is movable relative thereto. The fingers of a finger seal are an integral part of the seal, usually formed by machining a series of curved slots in a forged ring or a length of sheet stock, the slots being of consistent length and extending from a common edge of the material. A complete seal is usually made up of two or more layers of fingers relatively positioned such that the gaps between fingers in one layer are blocked by the fingers of the next layer.

Also, like brush seals, finger seals may take on a variety of configurations. For example, U.S. Pat. No. 5,042,823, entitled Laminated Finger Seal, and issued on Aug. 27, 1991 to Mackay et al., discloses one embodiment of an annular seal having fingers extending axially toward a rotating surface, and another embodiment with fingers extending radially inward toward a circumscribed shaft. Due to the close fitting relationship that can be obtained between fingers, and between layers fingers, these seals can offer improved sealing effectiveness over labyrinth seals and even over conventional brush seals.

A problem with finger seals is that at high shaft speeds, the rubbing contact causes excessive heating of the components, which in turn lowers the durability and ultimately limits the life of the seal. The problem is further aggravated when the seal is used in higher temperature applications. As a result, various techniques have been employed to increase the speeds and temperatures at which finger seals may be effectively used. For example, U.S. Pat. No. 5,108,116 entitled Laminated Finger Seal with Logarithmic Curvature, and issued on Apr. 28, 1992 to Johnson et al., discloses a finger seal designed to reduce wear by providing a foot portion at the end of each finger. The foot portion is wider than the finger in the Circumferential direction, thereby increasing the surface area in contact with the shaft so as to spread the contact load and reduce wear. Another technique commonly employed for increasing durability is to provide a hardened coating on the contacting surfaces of both the finger and the rotating component. Nevertheless, at the current level of the technology the extent to which finger seals can displace labyrinth seals in higher speed and temperature installations is limited.

Accordingly, a need exists for a seal capable of extended use in high speed and temperature environments of turbine engines for air to air, or air to oil sealing, and having sealing effectiveness comparable to that of conventional finger seals.

SUMMARY OF THE INVENTION

In view of the above, it is an object for this invention to provide a seal capable of extended use in high speed and temperature environments of turbine engines with more positive control of leakage flow than either conventional brush-type or labyrinth seals.

The present invention achieves these objects by providing an annular sealing apparatus for disposition between a body defining a bore and a rotating member such as a seal rotor mounted on a rotating shaft or the shaft itself, rotatably received in the bore to inhibit fluid leakage therebetween. The sealing apparatus is comprised of axially juxtaposed first and second comb-like pluralities of uniformly spaced and integral finger members circumscribing the rotating member. Each finger member has substantially the same width and the same logarithmic spiral curvature, and is separated from adjacent finger members by a uniform gap. Importantly, at the innermost end of each finger member is a foot portion for sealingly and movably engaging the rotating member. Each foot portion is substantially larger than the respective finger member and preferentially shaped to enhance hydrodynamic lifting so as to enable the foot portion to lift away from the rotating member and run on a thin film of air during engine operation. The first and second comb-like members are positioned so that the fingers of each block the gaps in the other.

These and other objects, features and advantages of the present invention are specifically set forth in or will become apparent from the following detailed description of a preferred embodiment of the invention when read in conjunction with the accompanying drawings.

BRIEF DESCRIPTION OF THE DRAWINGS

FIG. 2 depicts an enlarged fragmentary sectional view of an encircled portion of FIG. 1.

FIG. 3A depicts a portion of the transverse sectional view of FIG. 3 showing only a single finger portion.

FIG. 5 depicts a single diaphragm member with only a portion of the finger members of the sealing apparatus of FIGS. 1–4.

DESCRIPTION OF THE PREFERRED EMBODIMENT

Figure 1:
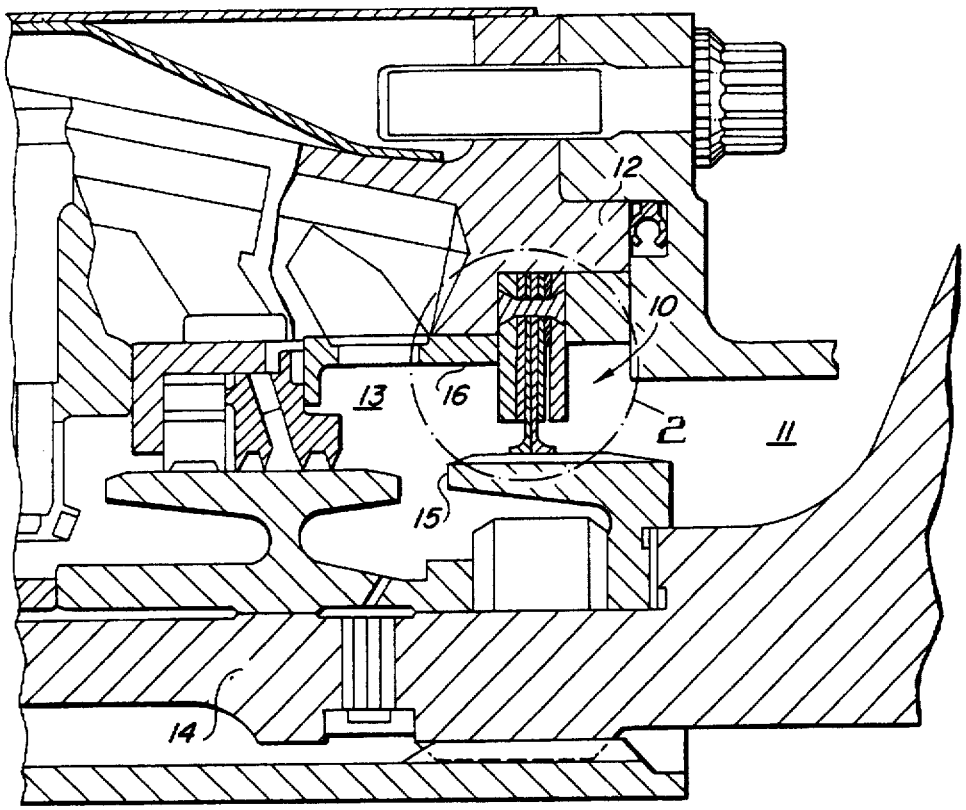
FIG. 1 depicts a cross-section view of a sealing apparatus embodying the invention within a portion of a gas turbine engine.

Viewing FIGS. 1–5 in conjunction, FIG. 1 shows a sealing apparatus generally referenced with the numeral 10 mounted in a portion of a gas turbine engine. The sealing apparatus 10 is disposed in between a housing 12 and a rotating member of the engine such as a seal rotor 15 mounted to a shaft 14 or the rotatable shaft 14 itself, to provide sealing therebetween and to thereby prevent fluid communication between a cavity 11 at a higher pressure than a cavity 13. Particularly, the housing 12 defines a bore 16 through which passes the rotatable shaft 14 and seal rotor 15. The sealing apparatus 10 is carried by the housing 12 at bore 16 and encircles the seal rotor 15 in sealing tight relatively movable relation therewith.

FIG. 2 better shows that the sealing apparatus 10 includes a pair of annular cover plates 18 carried by housing 12 and extending toward but short of seal rotor 15. Between cover plates 18 are an outer pair of annular metallic diaphragm members 21, and an inner pair of annular metallic diaphragm members 20. A washer 29 is disposed between the outer diaphragm 21 and cover plate 18 on the side of the seal facing the higher pressure cavity 11. The washer 29 extends radially inward only as far as housing 12, providing for an axial separation 28 between cover plate 18 and diaphragm 21 on the high pressure side. A plurality of axially coaligning holes 22 are defined through cover plates 18, diaphragm members 20 and 21, and washer 29, near their outer perimeters. A clamped assembly 25 is formed by installing rivets 23 through holes 22, whereby all diaphragm layers and washer 29 are clamped between cover plates 18. Importantly, washer 29 prevents the portions of diaphragms 20 and 21 adjacent seal rotor 15 from being axially pinched by directing the clamping load through the radially outer portions of the diaphragms only.

Figure 3:
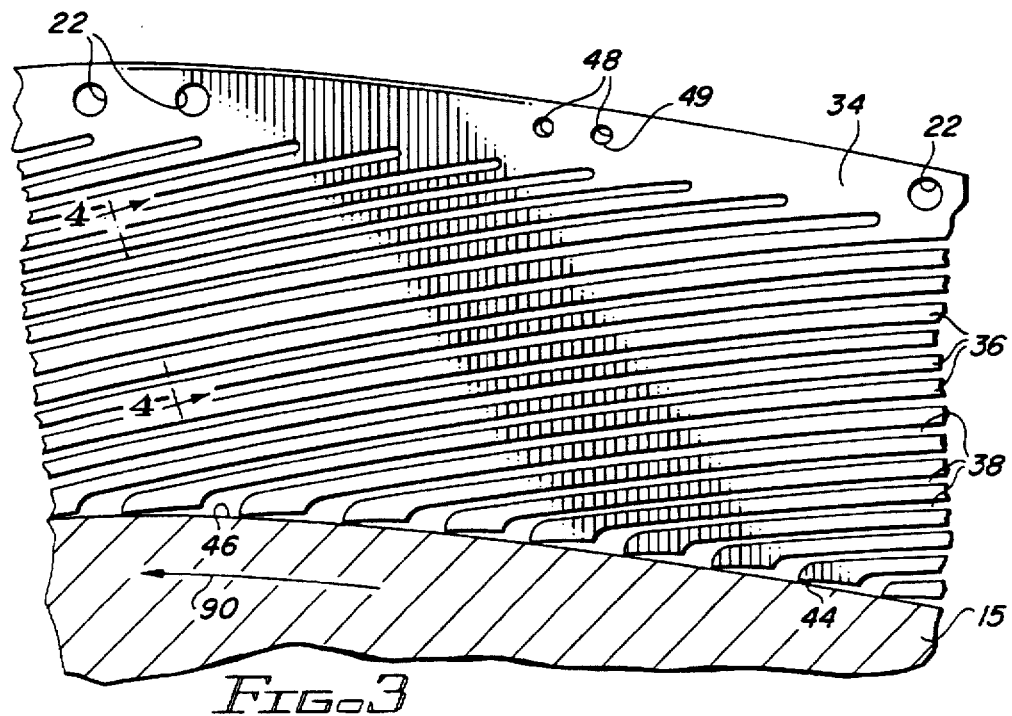
FIG. 3 depicts a transverse sectional view taken along line 3—3 of FIG. 2.

Viewing FIGS. 2 and 3 in particular, diaphragm members 20 and 21 extend toward seal rotor 15. Inner diaphragm members 20 extend far enough so as to slidably engage the seal rotor 15, whereas outer diaphragm members 21 stop short of seal rotor 15. As seen in FIGS. 3, 3A, and 5, each diaphragm member has a circumferentially continuous band portion 34 radially wide enough to encompass holes 22. Radially inward from band portions 34, each diaphragm member defines a plurality of circumferentially uniformly arranged finger portions 36 having about the same thickness. The finger portions 36 are circumferentially spaced apart to define a plurality of uniform gaps 38 therebetween that are narrower than the finger portions. The combination of the band portion 34, the finger portions 36, and the between finger gaps 38 gives the diaphragm members a comb-like configuration.

As shown in FIGS. 3 and 3A, each of the finger portions 36 has a circumferential logarithmic curvature. The curvature of each of the finger portions 36 is substantially the same. This curvature is defined by preselecting a spiral angle $\phi$ and then solving equation (1) to determine the radius r from the center 17 of the shaft 14 at any point along the finger portion 36.

$$r/r_i = e^{\beta \tan \phi}$$

In equation (1), $r_i$ is the radius from the center 17 of the shaft 14 to the innermost end of the finger portion 36. $\beta$ is the angle between r and $r_i$ in radians, and $\phi$, the spiral angle, is the angle between the finger portion 36 and a line 50 tangent to r. It has been found that the lower the spiral angle $\phi$ the greater the flexibility of the finger portions 36.

The innermost end of each of the finger portions 36 of the inner diaphragms 20 has an integral foot portion 44 with a radially innermost surface 45 that contacts the surface 46 of seal rotor 15. The foot portion 44 has a circumferential width $t_2$ greater than $t_1$ which would be the circumferential width of the finger portion 36 if it were extended to inner surface 45, and an axial width $t_4$ greater than $t_3$ which would be the axial width of the finger portion 36 if it were extended to the inner surface 45. The combined effect of the increased circumferential and axial widths gives an area of surface 45 at least three times what would be the area of finger portion 36 extended to surface 45. Importantly, the greatly increased surface area enables the generation of sufficient hydrodynamic force to cause foot 44 to lift off at relatively low engine shaft speeds, as described in greater detail below.

As depicted in FIG. 2, one axially facing edge of each foot portion 44 is coplanar with the same edge of its respective finger portion, defining flat surface 47 against which inner diaphragm members 20 axially abut. The greater axial width $t_4$ of each foot portion 44 is thus formed entirely on the side of diaphragm member 20 opposite surface 47. It can be further seen from FIG. 2 that the innermost diameter of the outer diaphragms 21 must therefore be great enough to radially clear foot portions 44 in order for diaphragms 21 to lay flat against inner diaphragms 20.

Foot portion 44 is bounded by a leading edge 43 and a trailing edge 41 as referenced to the direction of shaft rotation indicated by arrow 90. Inner surface 45 of foot 44 has a contacting portion 51 adjacent trailing edge 41 and a raised portion 52 extending from leading edge 43, and is configured so that when seal 10 is fitted to seal rotor 15 only contacting portion 51 touches seal rotor 15. Viewing FIG. 3A, raised portion 52 smoothly tapers radially away from seal rotor 15 to form a circumferentially wedge-shaped gap 53 therebetween. This preferential shape of surface 45 further enhances the hydrodynamic lifting effect on the foot portion.

Figure 6:
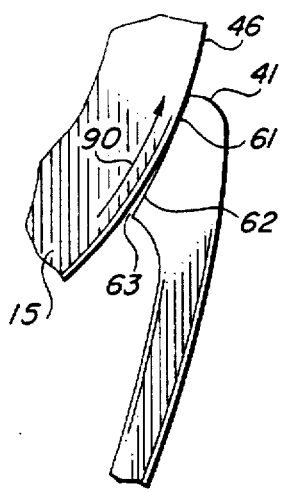
FIG. 6 depicts a portion of a transverse sectional view of a sealing apparatus embodying the invention showing only a single finger portion and foot portion, the foot portion having an alternative shape.
Figure 6A:
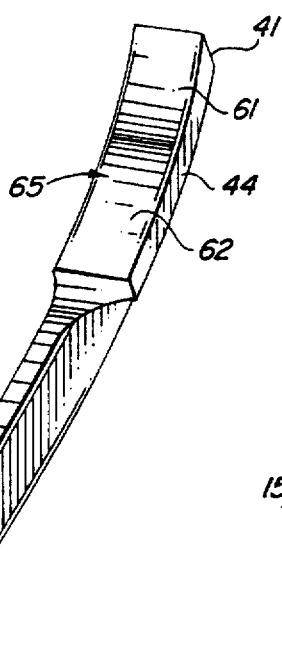
FIG. 6A depicts a perspective view of only the finger portion and foot portion of the sealing apparatus of FIG. 6.

Alternative shapes for the inner surface of foot portion 44 that also contribute to the hydrodynamic lifting force are shown in FIGS. 6 through 8A. In the alternative shape shown in FIGS. 6 and 6A, inner surface 65 is only partially tapered, having a contacting portion 61 extending from trailing edge 41 comprising a substantially larger portion of inner surface 65 than in the preferred embodiment. A raised portion 62 similarly tapers radially away from seal rotor 15 to form a much smaller circumferentially wedge-shaped gap 63.

Figure 8:
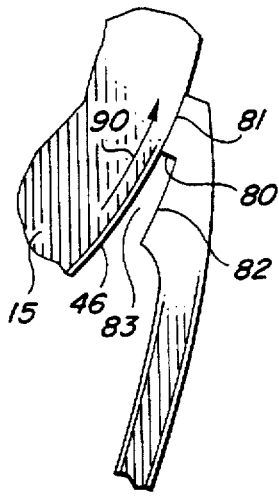
FIG. 8 depicts a portion of a transverse sectional view of a sealing apparatus embodying the invention showing only a single finger portion and foot portion, the foot portion having yet another alternative shape.
Figure 8A:
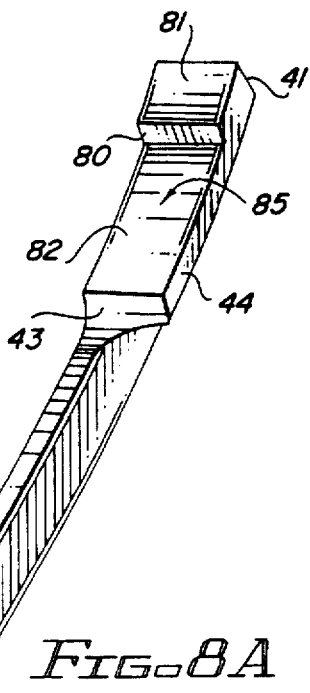
FIG. 8A depicts a perspective view of only the finger portion and foot portion of the sealing apparatus of FIG. 8.

In another alternative depicted in FIGS. 8 and 8A, a radial step 80 divides inner surface 85 into a contacting portion 81 nearest the foot trailing edge 41, and a raised portion 82 extending to leading edge 43. Raised portion 82 of surface 85 may be tapered outward to form a truncated wedge-shaped gap 83, or contoured to form a gap of uniform thickness (not shown).

Figure 7:
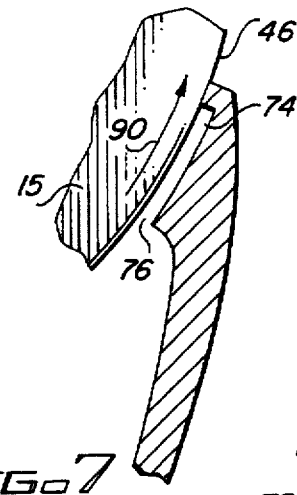
FIG. 7 depicts a portion of a transverse sectional view of a sealing apparatus embodying the invention showing only a single finger portion and foot portion, the foot portion having another alternative shape.
Figure 7A:
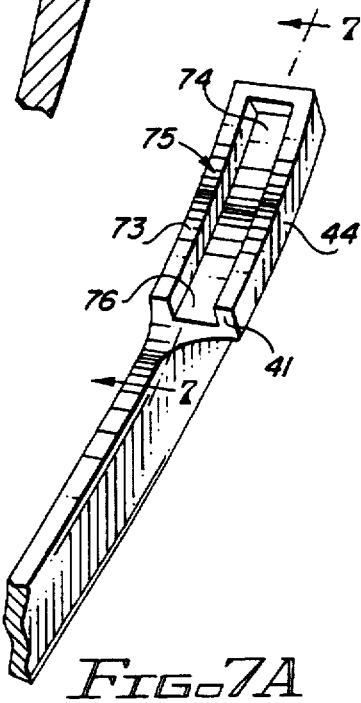
FIG. 7A depicts a perspective view of only the finger portion and foot portion of the sealing apparatus of FIG. 7.

In yet another alternative illustrated in FIGS. 7 and 7A a radial step configuration similar to that of FIGS. 8 and 8A is modified by the addition of sidewalls 73 to form a pocket 74 having an open end 76 adjacent leading edge 41 of foot 44. Sidewalls 73 are contoured to match the curvature of surface 46 of seal rotor 15.

Referencing FIG. 5, the foot portions 44 of inner diaphragms 20 cooperatively define an inner diameter, referenced with the numeral 42, which is slightly less than the outer diameter of seal rotor 15. Consequently, when the diaphragm members 20 are received about the rotating seal rotor 15 a running interference is created between the inner surfaces 45 of the foot portions 44 and the outer surface 46 of the seal rotor 15. This interference causes each of the finger portions 36 to slightly deflect which in turn cause the inner surface of the foot portions 44 to lightly press against the outer surface 46 of seal rotor 15. Preferably, the outer surface 46 of seal rotor 15 is hard coated to reduce wear. However, because of the logarithmic spiral, the finger portions 36 are more flexible than finger portions without such a spiral. This greater flexibility allows the finger portions 36 to more easily deflect thus reducing the rubbing between the foot portions 44 and the surface 46. Also, the radial compliance of the finger portions 36 is sufficient to easily accommodate all vibratory excursions or maneuvers load deflections on shaft 14. In addition, this increased flexibility facilitates maximizing the thickness of the air film between the foot portion 44 and seal rotor 15 as described in greater detail below.

Each of the diaphragm members defines a pair of circumferentially spaced indexing apertures 48. The spacing between apertures 48 is an odd integer multiple of one-half the circumferential spacing of fingers 36. Consequently, axially adjacent diaphragm members may be circumferentially alternated by passage of a single indexing pin 49 through alternate ones of the pair of indexing apertures. The indexing pin 49 is also received in a retention hole, not shown, in each of the cover plates 18 to prevent relative rotation of the diaphragm members. Alternatively, rivets 23 installed through holes 22 may be relied on for relative circumferential positioning of the diaphragm members.

Figure 4:
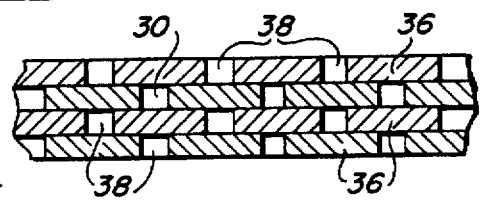
FIG. 4 provides an enlarged fragmentary cross-sectional view taken along line 4—4 of FIG. 3.

FIG. 4 illustrates the advantageous cooperative effect of the indexed circumferential orientation of adjacent diaphragm members. It is easily seen that because the between finger gaps 38 are considerably narrower circumferentially than are the finger portions 36, the gaps of each diaphragm member are blocked axially by the finger portions of the axially next adjacent diaphragm member. Consequently, the axially successive finger portions act as a positive seal to prevent axial passage of fluid. It will be apparent to those skilled in the art that although outer diaphragms 21 increase sealing effectiveness in this regard, they are not critical to the disclosed invention, and if desired may be eliminated.

The choice of seal material depends on the application. For high temperatures, the preferred material would be Inconel X750. For lower temperatures, any of the Inconel 600 series would suffice. Generally speaking, alloys with high molybdenum content would be preferred for wear resistance and low friction. In some cases, coatings such as PS200 (a composition developed by NASA) may be beneficial; and for temperatures below 300° F. (135° C.), Polymide (plastic) coatings may be adequate.

In operation, foot portion 44 runs in rubbing contact with surface 46 of the seal rotor 15 at very low shaft rotational speeds associated with engine start-up transients, lifting off from surface 46 as the engine exceeds these levels. Specifically, lift off of the seal occurs at least prior to the engine reaching 50% of minimum normal operating speed, and in all cases prior to reaching idle speed. Although some rubbing contact is present at the low shaft speeds, wear of the seal rotor and seal is insignificant. As previously described, several design features, such as for example the logarithmic spiral of the finger portions 36, and the hard coating on the seal rotor 15, interact to minimize wear of the foot and the seal rotor when in rubbing contact with one another. More significantly, the majority of seal and seal rotor wear in conventional finger seals occurs at engine speeds above those at which the seal of the present invention operates in rubbing contact. It is at these normal operating speeds, at or above idle, where the majority of seal use typically occurs and where heat generated by the rubbing contact contributes significantly to seal wear. Thus, the seal of the present invention minimizes wear by operating in rubbing contact only during a small percentage of total seal operation time, and only at low enough engine speeds where heat induced wear is not a significant factor.

The seal lifts off from the seal rotor as a result of the hydrodynamic force generated by rotation of seal rotor 15. More specifically, rotation of seal rotor 15 through viscous action causes a rotating film of a fluid, such as air, to be carried closely adjacent the seal rotor surface in the direction of rotation. The foot portion 44 of each finger portion 36 is initially partially submersed within the film, and oriented so that the wedge-shaped gap 53 between inner surface 45 and seal rotor surface 46 opens toward the oncoming fluid film. By positioning such a foot having the described increased surface area and preferential shape, a radially outward lifting force is generated which acts against the previously described radially inward spring force. When shaft 14 reaches a sufficient rotational speed, the radially outward lifting force exceeds the radially inward spring force, causing foot 44 to lift away from seal rotor 15.

An inherent feature of the present invention is that the maximum lift off height obtained is self limiting. The rotational velocity of the fluid film decreases quickly with increasing distance from the surface of seal rotor 15. Thus when foot 44 lifts off and moves away from the shaft, the speed of the air flowing past foot 44, and consequently the lifting force thereon, decreases. In contrast, the mechanical spring rate of the fingers 36 causes the radially inward spring force to increase as the foot 44 moves away from the seal rotor 15. Thus, although initially upon reaching a sufficient shaft speed the lift force exceeds the spring force, as the foot continues moving away from the seal rotor a point is reached whereupon the decreasing lift force no longer exceeds the increasing spring force. Upon reaching this point, the outward motion stops, thereby establishing a running clearance for that particular shaft speed. Running clearance is preferably less than one thousandth of an inch at normal engine operating speed.

It is preferable to configure foot 44 to maximize the lift force generated so that the shaft rotational speed at which the seal lifts off, and consequently seal wear, is minimized. It will be apparent that the lift force may be most effectively increased by increasing the area of surface 45 of foot 44. However, increasing the surface area of the foot causes a corresponding increase in the amount of viscous heating imparted to the rotating film of air. Detrimental effects associated with this resulting increased air temperature may impose a practical limit on the size of the foot portion. Accordingly, for a particular installation the optimal size and shape may require a tradeoff between an acceptable seal lift off speed, and an acceptable level of heating of the fluid film.

Various modifications and alterations of the above described sealing apparatus will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. An annular sealing apparatus for disposition in cooperation with a body defining a bore and a rotating member rotatably received in said bore to inhibit fluid leakage therebetween, said sealing apparatus comprising a first circumferentially extending comb-like member having a plurality of uniformly spaced integral finger members, and a second circumferentially extending comb-like member also having a plurality of uniformly spaced integral finger members, said pluralities of finger members circumscribing said rotating member, said finger members defining gaps therebetween, each of said finger members having at its innermost end a foot portion sealingly and movably engaging said rotating member, said foot portion configured to produce a hydrodynamic lift upon sufficient rotational speed of said rotating member, whereby said foot portion lifts off from said rotating member, said first and second comb-like members being positioned so that the fingers of each block the gaps of the other, and wherein each of said foot portions has greater circumferential and axial dimensions than the respective dimensions of the remainder of its respective finger member, said greater dimensions defining a surface area of said foot portion at least three times the area of its respective finger member measured on a cross section adjacent said foot portion.

2. The annular sealing apparatus of claim 1 wherein said comb-like members each have one flat axially facing surface for axially abutting one another, said greater axial width of said foot portion being disposed entirely on the side of said comb-like member opposite said flat surface.

3. The annular sealing apparatus of claim 1 wherein said foot portion of each of said finger members has an innermost surface for movably engaging said rotating member, said surface bounded by a leading circumferential edge and a trailing circumferential edge, and having a contacting portion and a raised portion configured to enhance said hydrodynamic lift upon rotation of said rotating member.

4. The annular sealing apparatus of claim 3, wherein said raised portion of said innermost surface extends from said contacting portion located adjacent said trailing edge to said leading edge, said raised portion disposed at a greater radius than said contacting portion thereby defining a gap between said rotating member and said raised portion.

5. The annular sealing apparatus of claim 4, wherein said raised portion smoothly tapers radially outward from said trailing edge toward said leading edge such that said gap between the rotating member and raised portion is wedge-shaped.

6. The annular sealing apparatus of claim 4, wherein said innermost surface includes a radial step separating said contacting portion from said raised portion.

7. The annular sealing apparatus of claim 6, wherein said raised portion tapers radially outward to form a truncated wedge-shaped gap between said rotating member and said raised portion.

8. The annular sealing apparatus of claim 6, further comprising sidewalls extending radially inward from said raised portion forming a pocket, said pocket being open at the end adjacent said leading edge.

9. The annular sealing apparatus of claim 1, wherein each of said finger members has a logarithmic curvature.

10. The annular sealing apparatus of claim 9, wherein said logarithmic curvature is defined by the equation, $$r/r_i = e^{\beta \tan \phi}$$

wherein $r_i$ is the radius from the center of said rotating member at any point along said finger member, $r_i$ is the radius from the center of said rotating member to said foot portion of said finger member, $\beta$ is the angle between r and $r_i$ in radians, and $\phi$ is the angle between said finger member and a tangent to r.

11. The annular sealing apparatus of claim 1 further comprising at least one additional comb-like member juxtaposed with each of said first and second comb like members, said additional comb-like members each having a plurality of uniformly spaced integral finger members circumscribing said rotating member, said finger members defining gaps therebetween, the innermost ends of said finger members defining a bore for loosely receiving said foot portions of said first and second comb-like members, and said additional comb-like members positioned relative to said first and second comb-like members so that the fingers of each block the gaps of the other.

12. An annular sealing apparatus for disposition in cooperation with a body defining a bore and a rotating member rotatably received in said bore to inhibit fluid leakage therebetween, said sealing apparatus comprising a first circumferentially extending comb-like member having a plurality of uniformly spaced integral finger members, and a second circumferentially extending comb-like member also having a plurality of uniformly spaced integral finger members, said pluralities of finger members circumscribing said rotating member, said finger members defining gaps therebetween, each of said finger members having at its innermost end a foot portion sealingly and movably engaging said rotating member, each of said foot portions having greater circumferential and axial dimensions than the respective dimensions of the remainder of its respective finger member, said greater dimensions defining a surface area of said foot at least three times the area of its respective finger member measured on a cross section adjacent said foot portion, and said first and second comb-like members being positioned so that the fingers of each block the gaps of the other.

13. A gas turbine engine having primary and secondary gas flowpaths separated by an annular sealing apparatus, said sealing apparatus disposed in cooperation with a wall having a bore and a rotating member rotatably received in said bore to inhibit fluid leakage therebetween, said sealing apparatus comprising first and second circumferentially extending comb-like members each having a plurality of uniformly spaced integral finger members, said pluralities of finger members circumscribing said rotating member, said finger members defining gaps therebetween, each of said finger members having at its innermost end a foot portion sealingly and movably engaging said rotating member, said foot portion configured to produce a hydrodynamic lift upon sufficient rotational speed of said rotating member whereby said foot portion lifts off from said rotating member, said first and second comb-like members being positioned so that the fingers of each block the gaps of the other, and wherein each of said foot portions has greater circumferential and axial dimensions than the respective dimensions of the remainder of its respective finger member, said greater dimensions defining a surface area of said foot portion at least three times the area of its respective finger member measured on a cross section adjacent said foot portion.

14. The gas turbine engine of claim 13, wherein said comb-like members each have one flat axially facing surface for axially abutting one another, said greater axial width of said foot portion being disposed entirely on the side of said comb-like member opposite said flat surface.

15. The gas turbine engine of claim 14, wherein said foot portion of each of said finger members has an innermost surface for movably engaging said rotating member, said surface bounded by a leading circumferential edge and a trailing circumferential edge, and having a contacting portion and a raised portion configured to enhance said hydrodynamic lift upon rotation of said rotating member.

16. The gas turbine engine of claim 15, wherein said raised portion of said innermost surface extends from said contacting portion located adjacent said trailing edge to said leading edge, said raised portion disposed at a greater radius than said contacting portion thereby defining a gap between said rotating member and said raised portion.

17. The gas turbine engine of claim 16, wherein said raised portion smoothly tapers radially outward from said trailing edge toward said leading edge such that said gap between the rotating member and said raised portion is wedge-shaped.

18. The gas turbine engine of claim 13, wherein said sufficient rotational speed of said rotating member is less than the rotational speed of said rotating member at engine idle speed.

19. A gas turbine engine having a secondary gas flowpath defining a system of conduits for distributing compressed air throughout said engine, and at least one annular sealing apparatus separating said compressed air from engine cavities containing lubricating oil, said annular sealing apparatus disposed in cooperation with a wall having a bore and a rotating member rotatably received in said bore to inhibit fluid leakage therebetween, said sealing apparatus comprising a first circumferentially extending comb-like member having a plurality of uniformly spaced integral finger members, and a second circumferentially extending comb-like member also having a plurality of uniformly spaced integral finger members, said pluralities of finger members circumscribing said rotating member, said finger members defining gaps therebetween, each of said finger members having at its innermost end a foot portion sealingly and movably engaging said rotating member, said foot portion configured to produce a hydrodynamic lift upon sufficient rotational speed of said rotating member, whereby said foot portion lifts off from said rotating member, and said first and second comb-like members being positioned so that the fingers of each block the gaps of the other, and wherein each of said foot portions has greater circumferential and axial dimensions than the respective dimensions of the remainder of its respective finger member, said greater dimensions defining a surface area of said foot portion at least three times the area of its respective finger member measured on a cross section adjacent said foot portion.

* * * * *